Aug. 25, 1942. V. E. HOFMANN ET AL 2,294,339
TEMPERATURE RESPONSIVE APPARATUS FOR ROTATABLE BODIES
Filed June 21, 1938 2 Sheets-Sheet 1
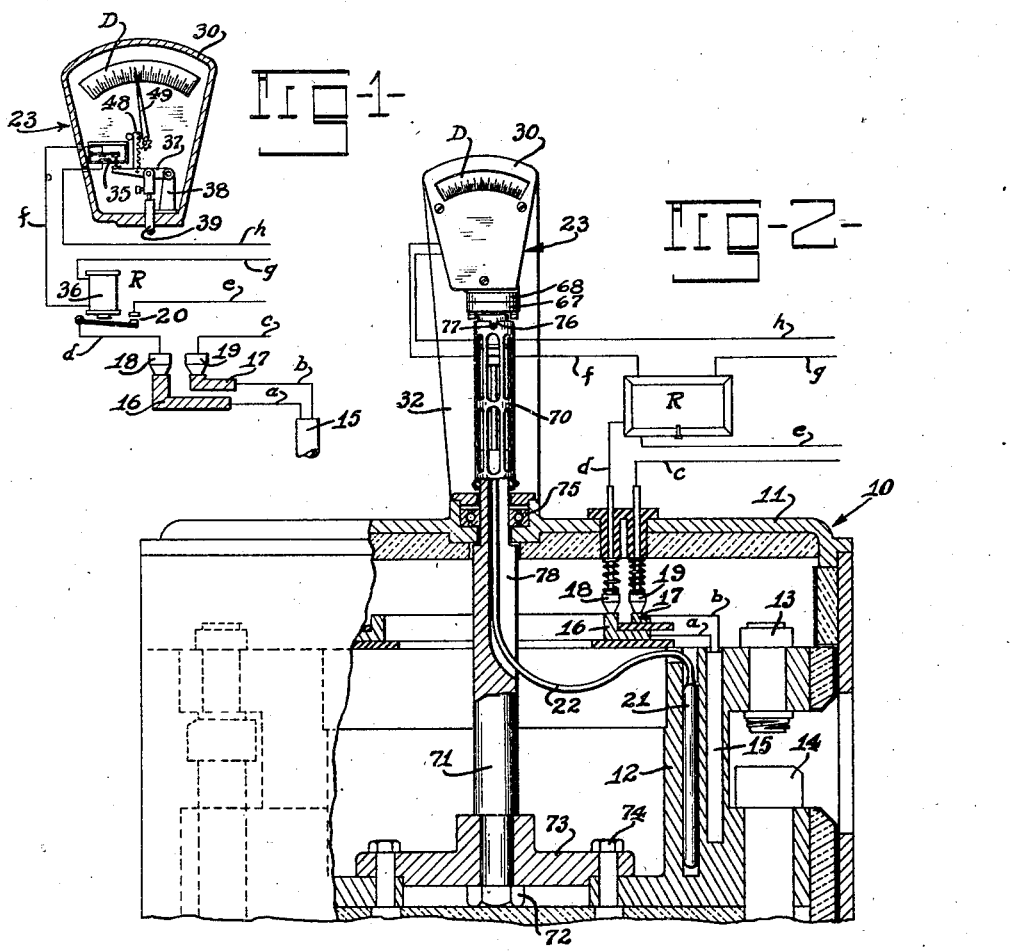
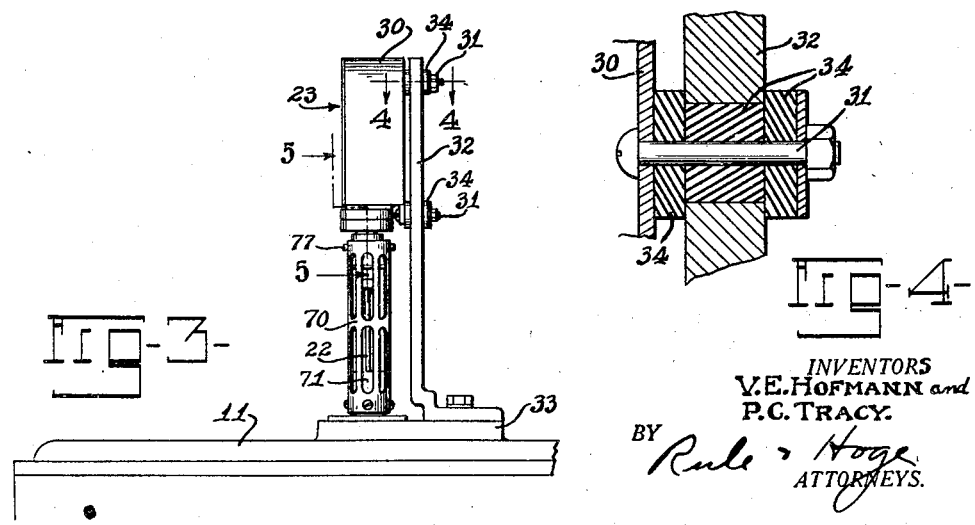
INVENTORS
V. E. HOFMANN and
P. C. TRACY.
BY
ATTORNEYS.

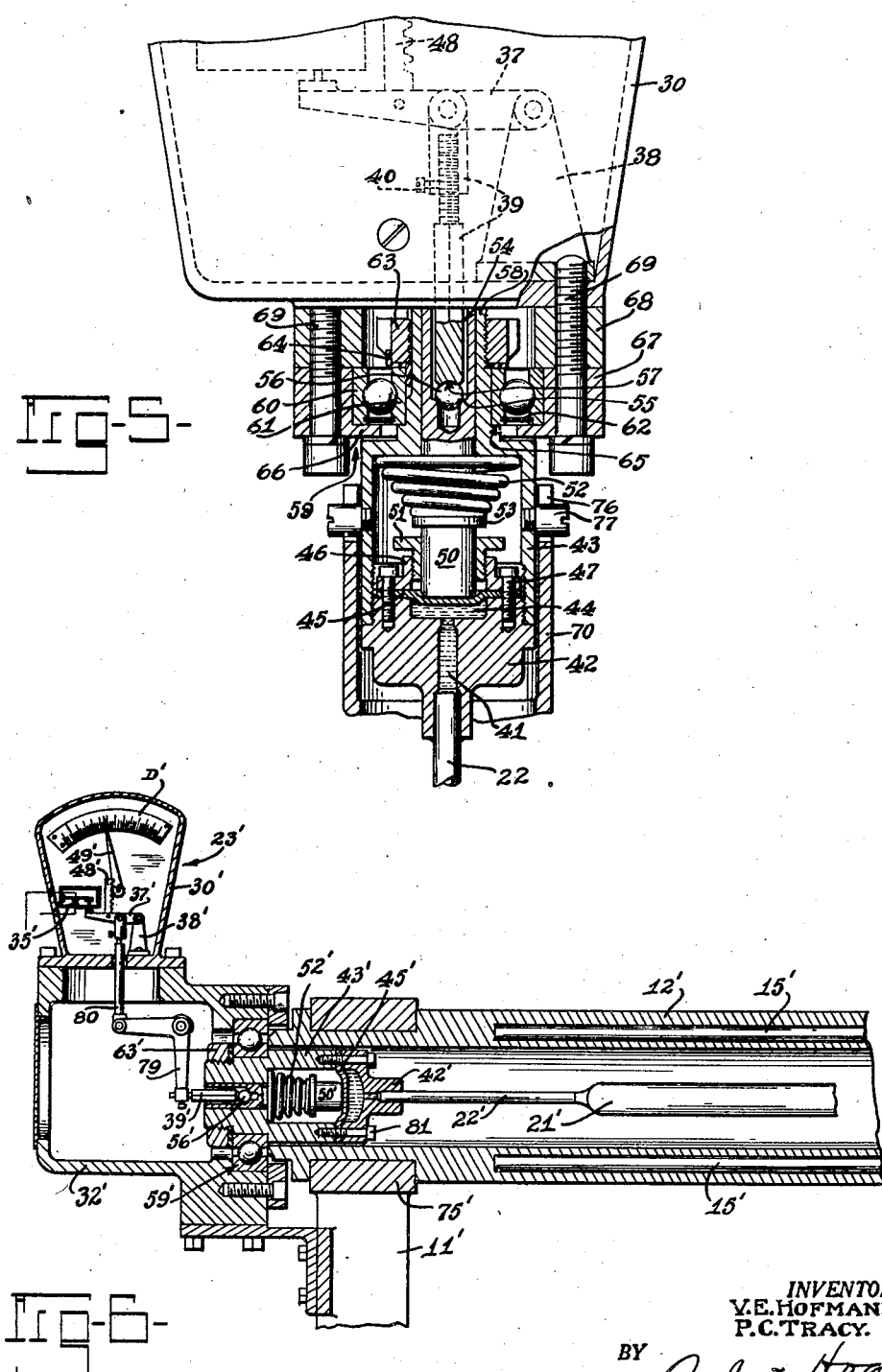

Patented Aug. 25, 1942

2,294,339

UNITED STATES PATENT OFFICE 2,294,339

TEMPERATURE RESPONSIVE APPARATUS FOR ROTATABLE BODIES

Victor E. Hofmann and Parker C. Tracy, Toledo, Ohio, assignors to Owens-Illinois Glass Company, a corporation of Ohio Application June 21, 1938, Serial No. 215,076

3 Claims. (Cl. 73—351)

The present invention relates to temperature control apparatus and more particularly to automatic electric temperature control apparatus for regulating and indicating the temperature of electrically heated rotary or revolving castings such as the mold head castings of rotary plastic molding machines; laundry equipment such as rotary ironers, manglers, pressers and the like; rotary melting pots, furnaces, bake ovens, drying ovens, cyanide and other chemical treating pots, lead soaking pots and all manner of similar equipment. If desired the temperature indicating features of the apparatus may be dispensed with entirely and the same may be employed simply for regulating the temperature of heated rotary castings. Likewise, the temperature indicating features of the invention may be retained while the temperature regulating features thereof may be dispensed with without departing from the spirit of the invention.

The principal object of the invention is to provide an apparatus of the type set forth above including stationary temperature control instrumentalities which may be affixed to a stationary part such as the casing of a molding machine or other equipment the temperature of which is to be regulated, and a heat sensitive element which is preferably of the mercury bulb type and which is embedded in the rotary mold head casting or other electrically heated casting, together with means for operatively connecting the heat sensitive element mechanically to the control instrumentalities and means for operatively connecting the electric heating element or elements electrically with a source of current through the control instrumentalities.

Another object of the invention is to provide an apparatus of this type which is capable of regulating the temperature of rotary castings within very small limits of temperature variation and which, toward this end, is provided with temperature control instrumentalities that are extremely delicate yet which at the same time are so mounted and connected to the movable heat sensitive element in such a manner that they are not affected by normal vibration of the molding machine or other equipment.

In regulating and indicating the temperature of revolving castings it is possible to employ a movable thermocouple which is embedded in the revolving casting and which is connected in the heating circuit of which it forms part or is connected in a relay circuit in such a manner that current may flow continuously through the circuit. Toward this end, in order to establish electrical contact between the moving wires and the stationary wires in the circuit, resort may be had either to a sliding ring or brush type of connector or to the circular mercury trough type of connector. In the former instance the electrical losses in the vicinity of the sliding rings are often as great or nearly so as the volume of current in the circuit leading from the thermocouple particularly when the rings become worn and dirty. Because of this the sliding ring type of connector is unsuitable for the purpose. In the latter instance the stationary electrodes which dip into the revolving mercury become dirty as well as does the mercury itself and in addition the structure is expensive to manufacture.

A still further object of the invention is to provide a temperature control apparatus for regulating and indicating the temperature of revolving castings which will dispense with the necessity of employing a pyrometer thermocouple together with a friction type connector or liquid conductor type of connector therefor.

Other objects and advantages of the invention, not at this time particularly enumerated, will become readily apparent as the nature of the invention is better understood.

In the accompanying drawings:

Fig. 1 is a diagrammatic view of a temperature indicating and regulating control unit employed in connection with the present invention showing the electrical relay circuit by means of which the same is connected to the movable heating unit;

Fig. 2 is a fragmentary front elevational view partly in section and somewhat diagrammatic in its representation of a rotary molding machine showing the improved control apparatus applied thereto;

Fig. 3 is a fragmentary side elevational view of the apparatus shown in Fig. 2;

Fig. 4 is a sectional view taken substantially along the line 4—4 of Fig. 3;

Fig. 5 is an enlarged sectional view taken substantially along the line 5—5 of Fig. 3; and Fig. 6 is a fragmentary sectional view taken longitudinally and centrally through a steam heated mangler or ironing cylinder showing a modified form of temperature indicator and control apparatus operatively associated therewith.

Referring now to Fig. 2, the temperature control apparatus is shown applied to a rotary molding machine 10 including a stationary casing 11 in which there is rotatably mounted a mold or die supporting casting 12 upon which there is supported a series of male and female die elements 13 and 14 respectively. In order to heat the various die elements a plurality of heating elements 15 are embedded in the casting 12 in the vicinity of the die elements and are electrically connected in parallel by means of leads $a$ and $b$ to a pair of contact rings 16 and 17 respectively which are supported upon and insulated from the casting 12 and are insulated from each other. A pair of spring pressed brushes 18 and 19 extend through the casing 11, are insulated therefrom, and bear against the contact rings 16 and 17 respectively. The brush 19 is connected directly to a source of current (not shown) by means of a lead $c$ while the brush 18 is connected to the source of current through a switch 20 forming a part of a relay R by means of leads $d$ and $e$.

In order to control the temperature of the rotary casting 12 and maintain the same within the relatively narrow limits required for molding, thermostatic control means is provided for actuating the relay R to open and close the switch 20. Toward this end, a heat sensitive element 21 of the mercury bulb type is embedded in the casting 12 and is provided with a flexible capillary tube 22 which is operatively connected in a manner that will subsequently be described to a stationary temperature control and indicating unit 23 by means of which the relay R is actuated.

The temperature control and indicating unit 23 is a precision instrument of conventional design and no claim is made herein to any novelty connected therewith, the invention residing rather in the mechanism by means of which this instrument is operatively and mechanically connected with the rotatable heat sensitive element 21 and which will presently be described.

The unit 23 comprises a casing 30 (Figs. 3 and 4) which is secured by means of a pair of bolts 31 to a standard 32, the latter being bolted or otherwise secured to an upstanding boss 33 formed substantially centrally on the molding machine casing 11. The casing 30 is insulated from the standard 32 by means of resilient washers 34 which provide a floating mounting for the former in order that normal vibration of the molding machine shall not affect the delicate control instrumentalities housed within the casing 30. The control instrumentalities just referred to comprise a normally closed control switch 35 one terminal of which is connected through a coil 36, forming a part of the relay R, by means of leads $f$ and $g$ to a source of energizing current (not shown). The other terminal of the switch is connected by means of a lead $h$ directly to the source. The coil 36 when energized serves to close the normally open relay switch 20 and supply heating current to the various heating elements 15. Conversely, when deenergized, the relay switch 20 is opened to discontinue the supply of current to these heating elements.

The normally closed switch 35 is adapted to be opened when the temperature of the molding machine casting 12 arrives at a predetermined maximum and, toward this end, one terminal thereof is adapted to be elevated out of contact with the other terminal thereof by means of a lever 37 one end of which is pivoted to a bracket 38 mounted within the casing 30. The lever has pivotally connected thereto medially of its ends an extensible thrust rod 39 (Fig. 5) the two sections of which may be locked together in any desired position of adjustment by means of a set screw 40. The lever 37 is connected by means of a conventional pinion and rack mechanism 48 to a pointer 49 which indicates the temperature of the casting 12 upon a temperature indicating dial D.

Referring now to Fig. 5, the upper end of the capillary tube 22 is welded and sealed to the lower end of a tubular bore 41 provided in a plug member 42, which latter member of course rotates with the rotating upper end of the tube 22. The plug member 42 is threadedly received in and closes the lower end of a rotating casing 43. The plug member 42 is formed with a cup-shaped recess 44 which communicates with or opens into the bore 41 and across which there extends a diaphragm 45 the peripheral edge of which is clamped to the plug member 42 by means of a ring 46 and clamping bolts 47.

The recess 44 when closed by the diaphragm 45 constitutes a mercury chamber into which mercury flows by thermal expansion when the temperature of the molding machine casting 12 is increased. Conversely, the mercury recedes from the chamber by thermal contraction when the temperature of the casting 12 is decreased. The diaphragm 45 is therefore actuated by direct contact with the mercury and, upon expansion or contraction thereof, is adapted to raise or lower a plunger 50 the lower end of which is supported upon the diaphragm.

The lower end of the plunger 50 is centered upon the diaphragm 45 by means of a centering bushing 51 which is threadedly received in the ring 46. The plunger 50 is yieldingly maintained seated upon the diaphragm by means of a coil spring 52 the lower end of which is seated upon a flange 53 integrally formed on the plunger and the upper end of which bears against the casing 43.

The upper end of the plunger 50 has formed therein a relatively deep socket 54 the lower end of which is reduced to provide a seat 55 upon which there is loosely disposed a ball 56 upon which is supported the lower end of the thrust rod 39, a concavity 57 being formed in the rod to insure accurate seating of the same thereon. The casing 43 has formed thereon an upwardly extending sleeve 58 which surrounds the plunger 50. The sleeve 58 receives thereover a ball-bearing assembly 59 including outer and inner ball bearing races 60 and 61 respectively, and a grease retaining ring 62. A clamping nut 63 and lock washer 64 serve to clamp the inner race 61 against a shoulder 65 formed on the sleeve 58 to thus retain the ball-bearing assembly 59 in position on the latter. The outer race 60 is supported upon an inwardly directed circular flange 66 formed on a ring-like lower bearing support 67 which, together with a ring-like upper bearing support 68 which is concentric therewith, is clamped to and suspended from the casing 30 of the temperature control unit 23 by means of clamping bolts 69.

In order that the various parts which rotate with the upper end of the capillary tube 22 shall not rely upon the tube as the sole driving means therefor, a torque tube 70 surrounds these parts and has its lower end secured to an axially extending central rod 71 the lower end of which is bolted as at 72 centrally to a plate 73 which is in turn secured as at 74 to the casting 12 of the molding machine. The upper end of the central rod 71 is journalled in a bearing 75 carried by the casing 11 of the molding machine. The upper end of the torque tube 70 has formed therein a series of slots 76 through which driving pins 77 extend and are received in the walls of the casing

43. The central rod 71 is slotted as at 78 to accommodate the capillary tube 22.

In the operation of the temperature control apparatus, the switch 35 remains closed during the heating up of the molding machine and causes energizing current to flow through the circuit indicated by the lead $g$, coil 36, lead $f$, switch 35 and lead $h$. The coil 36, being thus energized, actuates the relay R to close the switch 20 and causes heating current to flow through the circuit indicated by the lead $c$, brush 19, ring 17, lead $b$, heating elements 15, lead $a$, ring 16, brush 18, lead $d$, switch 20 and lead $e$. When the temperature of the mold casting 12 reaches a predetermined degree the machine may be put into operation and, during such operation, should the temperature of the casting 12 exceed a predetermined maximum, thermal expansion of the mercury in the bulb 21 and capillary tube 22 occurs to such an extent that the diaphragm 45 is expanded to an extent sufficient to cause opening of the switch 35 in the manner previously described. Upon opening of the switch 35 the coil 36 is deenergized thus actuating the relay R and opening the switch 20 to cut off the supply of current to the various heating elements 15.

In the modified form of the invention shown in Fig. 6, the temperature indicating and regulating apparatus is shown operatively associated with an electrically heated cylinder or platen of a mangler. The platen or cylinder 12' is hollow and has a series of heating elements 15' embedded therein. A bearing 75' formed on a standard 11' supports one end of the cylinder. The temperature indicating and control unit 23' is mounted on a casing 32' and the lever 37' thereof is connected to one arm of a bell crank lever 79 by means of the thrust rod 80. The other arm of the lever 79 is connected to a second thrust rod 39' which engages the ball 56'. In this form of the invention, the plug member 42' is bolted as at 81 to the casing 43' instead of being threaded thereto while the heat sensitive element 21' is connected to the plug member 42' by a rigid capillary conduit or tube 22' instead of the flexible tube 22. The element 21' is thus centered within the cylinder 12' and is heated by radiation and convection from the walls thereof. The operation of this form of the invention is substantially the same as in the form shown in the remaining figures of the drawings, the main point of departure being the conversion of horizontal thrust as exerted by the thrust rod 39' to vertical thrust as exerted by the thrust rod 80. It is to be noted that the element 21' being suspended within the cylinder 12' is caused to rotate with the plug member 42' and therefore the torque tube 70 and its associated parts may be dispensed with.

Modifications may be resorted to within the spirit and scope of the appended claims.

We claim:

1. In temperature control apparatus, a stationary casing for housing indicating and control apparatus, a thrust rod extending through one wall of the casing and mounted for reciprocation, a fluid pressure system including a heat responsive bulb, a plug member having a chamber therein, a diaphragm closing said chamber, a capillary tube connecting the bulb and chamber, a plunger having one end in contact with the diaphragm and its other end formed with an axial socket, a ball loosely disposed in the bottom of the socket, said thrust rod having one end extending into the socket and in contact with the ball and means effecting rotative connection between the casing and said plug, including a tubular element secured to said plug, said element having a reduced neck-like extension forming a guide for the plunger, a ball bearing assembly encircling said extension, and means rigidly connecting the bottom of said casing and part of the ball bearing assembly.

2. In a temperature control apparatus, a fluid pressure system including a heat responsive bulb, a plug member having a chamber therein, a diaphragm closing the chamber, a capillary tube connecting the bulb and chamber, a plunger having one end in contact with the diaphragm and the other end formed with an axial socket, a ball loosely disposed in the bottom of the socket, a thrust rod having an end extending into said socket and in contact with the ball, a rotary casing secured to and rising from the plug and having a reduced upward axial extension providing a guide for the upper portion of said plunger, a stationary casing for housing indicating and control apparatus to be actuated by said thrust rod, and means rotatively connecting the base of said stationary casing and the reduced upward extension.

3. In a temperature control apparatus, a fluid pressure system including a heat responsive bulb, a plug member having a chamber therein, a diaphragm closing the chamber, a capillary tube connecting the bulb and chamber, a plunger having one end in contact with the diaphragm and the other end formed with an axial socket, a ball loosely disposed in the bottom of the socket, a thrust rod having an end extending into said socket and in contact with the ball, a rotary casing secured to and rising from the plug and having a reduced upward axial extension providing a guide for the upper portion of said plunger, a stationary casing for housing indicating and control apparatus to be actuated by said thrust rod, and means rotatively connecting the base of said stationary casing and the reduced upward extension, said means including a ball bearing assembly, the latter including an inner ball race encircling the upward extension, a lock ring securing said race against premature movement, an outer ball race and a clamping ring for locking said outer ball race to the base of said casing.

VICTOR E. HOFMANN.
PARKER C. TRACY.